United States Patent
Ajiro

(10) Patent No.: US 9,244,718 B2
(45) Date of Patent: Jan. 26, 2016

(54) VIRTUAL MACHINE RESOURCE ALLOCATION BASED ON CONNECTION TIME COVERAGE EXCEEDING A MINIMUM THRESHOLD

(71) Applicant: NEC Corporation, Minato-ku, Tokyo (JP)

(72) Inventor: Yasuhiro Ajiro, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/428,875

(22) PCT Filed: Sep. 12, 2013

(86) PCT No.: PCT/JP2013/005394
§ 371 (c)(1),
(2) Date: Mar. 17, 2015

(87) PCT Pub. No.: WO2014/045549
PCT Pub. Date: Mar. 27, 2014

(65) Prior Publication Data
US 2015/0234672 A1     Aug. 20, 2015

(30) Foreign Application Priority Data

Sep. 19, 2012   (JP) ................................. 2012-205670

(51) Int. Cl.
*G06F 9/455*     (2006.01)
*G06F 9/50*     (2006.01)
(Continued)

(52) U.S. Cl.
CPC ........ *G06F 9/45558* (2013.01); *G06F 9/45533* (2013.01); *G06F 9/50* (2013.01);
(Continued)

(58) Field of Classification Search
None
See application file for complete search history.

(56) References Cited

U.S. PATENT DOCUMENTS 8,141,090 B1 * 3/2012 Graupner ............ G06F 9/45558
709/225
8,396,807 B1 * 3/2013 Yemini .................. G06Q 10/06
705/400

(Continued)

FOREIGN PATENT DOCUMENTS

JP    2011-013822 A    1/2011
JP    2011076470 A    4/2011

(Continued)

OTHER PUBLICATIONS

International Search Report for PCT Application No. PCT/JP2013/005394, mailed on Oct. 8, 2013.

*Primary Examiner* — Emerson Puente
*Assistant Examiner* — Benjamin Wu

(57) ABSTRACT

The present invention provides an information processing device that outputs a machine disposition plan for moving virtual machines while suppressing deterioration in user experience performance in a virtual-machine-type thin client system. The information processing device is provided with: a connection time determination unit that, for each first virtual machine, calculates a time slot coverage rate that is the fraction of a connection time slot covered by a high-load time slot, and determines as a second virtual machine a first virtual machine of which the time slot coverage rate exceeds a minimum coverage rate; and a disposition plan generating unit that, on the basis of time-series data of the amount of resource use of each second virtual machine, calculates the number of physical servers necessary to hold the second virtual machines in each of the high-load time slot and a low-load time slot, and associates the number to the virtual machines, outputting the result.

10 Claims, 10 Drawing Sheets

(51) Int. Cl.
*G06F 11/30* (2006.01)
*G06F 11/34* (2006.01)

(52) U.S. Cl.
CPC ........... *G06F 11/30* (2013.01); *G06F 11/3442* (2013.01); *G06F 2009/45575* (2013.01); *G06F 2009/45595* (2013.01)

(56) References Cited

U.S. PATENT DOCUMENTS

| | | | | |
|---|---|---|---|---|
| 8,826,287 B1* | 9/2014 | Graupner | ............... | G06F 9/5061 709/223 |
| 2007/0283360 A1* | 12/2007 | Koretz | .................. | G06F 9/5061 718/105 |
| 2008/0295096 A1* | 11/2008 | Beaty | .................... | G06F 9/4856 718/1 |
| 2010/0138528 A1* | 6/2010 | Frank | .................... | G06F 9/5077 709/224 |
| 2011/0138037 A1* | 6/2011 | Sharma | ................... | G06F 9/505 709/224 |
| 2012/0131194 A1* | 5/2012 | Morgan | ................ | G06F 9/5072 709/226 |
| 2012/0278800 A1* | 11/2012 | Nicholas | ............. | G06F 9/45558 718/1 |
| 2013/0014113 A1* | 1/2013 | Ajiro | ...................... | G06F 1/329 718/100 |
| 2013/0116976 A1* | 5/2013 | Kanemasa | .......... | G06F 11/3452 702/186 |
| 2013/0124669 A1* | 5/2013 | Anderson | .......... | G06F 11/3006 709/217 |
| 2014/0282503 A1* | 9/2014 | Gmach | ............. | H04L 41/0823 718/1 |

FOREIGN PATENT DOCUMENTS

| | | |
|---|---|---|
| JP | 2011090594 A | 5/2011 |
| JP | 4853717 B2 | 11/2011 |
| WO | 2011/118424 A1 | 9/2011 |

* cited by examiner

Fig.3

161 CONNECTION HISTORY

| VMID | CONNECTION START DAY AND TIME | DISCONNECTION DAY AND TIME |
|---|---|---|
| 1 | 2012/07/23  9:51 | 2012/07/23  11:45 |
| 1 | 2012/07/23  13:12 | 2012/07/23  17:28 |
| 1 | 2012/07/24  8:36 | 2012/07/24  10:43 |
| ... | ... | ... |
| 2 | 2012/07/23  8:13 | 2012/07/23  17:03 |
| ... | ... | ... |

1611 CONNECTION TIME RECORD

Fig.6

173 LOW-LOAD TIME SLOT PORTION
RESOURCE USE AMOUNT HISTORY

1711 RESOURCE USE AMOUNT RECORD

| VMID | DAY AND TIME | CPU USE RATE (%) |
|------|--------------|------------------|
| K | 2012/07/23 0:00 | 0 |
| K | 2012/07/23 0:15 | 0 |
| ... | ... | ... |
| K | 2012/07/23 9:00 | 3 |
| K | 2012/07/23 17:15 | 8 |
| ... | ... | ... |
| K | 2012/07/23 23:45 | 2 |
| K | 2012/07/24 0:00 | 2 |
| K | 2012/07/24 0:15 | 1 |
| ... | ... | ... |

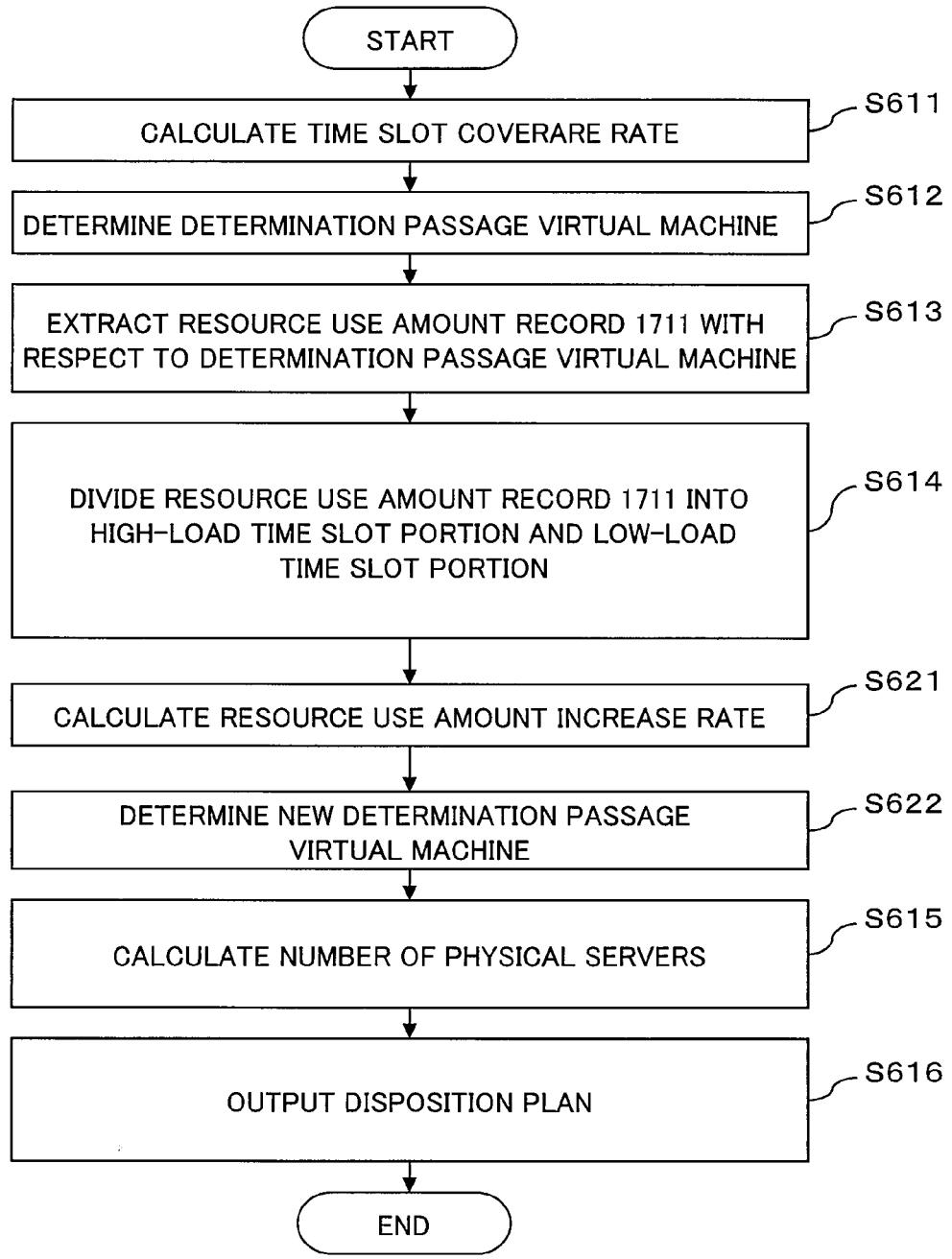

VIRTUAL MACHINE RESOURCE ALLOCATION BASED ON CONNECTION TIME COVERAGE EXCEEDING A MINIMUM THRESHOLD

This application is a National Stage Entry of PCT/JP2013/005394 filed on Sep. 12, 2013, which claims priority from Japanese Patent Application 2012-205670 filed on Sep. 19, 2012, the contents of all of which are incorporated herein by reference, in their entirety.

TECHNICAL FIELD

The present invention relates to an information processing device that generates a machine disposition plan for reducing the number of operating servers and power consumption thereof, a method for generating a machine disposition plan, and a program.

BACKGROUND ART

Various related techniques for reducing the number of operating servers and power consumption are known.

For example, there is a technique for reducing the number of operating servers and power consumption by devising the disposition of virtual machines. This technique includes a static disposition processing technique and a dynamic disposition processing technique. The static disposition processing technique is a technique in which demanded performance for a server is predicted from a past log or the like and a plan for controlling the number of operating servers is previously created. On the other hand, the dynamic disposition processing technique is a technique in which according to a load situation of a server or a system including the server at different times, the number of operating servers is controlled.

PTL 1 discloses a machine operation plan creation device. The machine referred to here is a physical computer or a virtual machine. This virtual machine is a virtual computer obtained by dividing computer resources of one physical computer into a plurality of virtual computers. Further, a physical computer virtual machine assumed to provide some sort of service is also referred to as a physical server. Similarly, a virtual machine assumed to provide some sort of service is also referred to as a virtual server.

The effect of the machine operation plan creation device described in PTL 1 is to create an operation plan so as to reduce the number of operating machines providing a web service in each time slot and also to minimize the operation number of starts and stops of the machines. The web service is a service in which a server returns a certain calculation result to a request from a client in a relatively short time (at least several seconds). The performance of the web service is represented by tps (Transaction Per Second) or the like that is the number of requests (transactions) processable per second.

In general, the performance needed for a certain web service changes with a time slot and has periodicity. Further, the number of requests processable by a certain machine is constant. Therefore, to process a large number of requests, there is used a method for enhancing processing performance by clustering a plurality of machines and distributing (load-dispersing) the requests among these machines. In such a configuration large in size, the number of machines necessary for each time slot varies.

The machine operation plan creation device described in PTL 1 receives a list of the number of machines needed in each time slot and creates an operation plan so as to minimize the number of starts and stops of each machine based on the list. Thereby, the machine operation plan creation device reduces the number of operating machines and power consumption thereof and also reduces trouble of setting changes, a risk of missetting, and the like associated with machine addition (start) and reduction (stop).

PTL 2 discloses a server management device. The server management device described in PTL 2 is a device that manages a plurality of cluster systems for providing a plurality of services.

The server management device described in PTL 2 includes a load information collection unit, a configuration information collection unit, a configuration change determination unit, a configuration change target selection unit, and a configuration change execution unit. The load information collection unit collects load information of a virtual server group configuring the cluster systems. The configuration information collection unit collects information as to which physical servers the virtual servers are allocated, as configuration information. The configuration change determination unit determines whether the number of virtual servers can be reduced from the load information. The configuration change target selection unit selects a physical server allocated with the fewest number of operating virtual servers by referring to the configuration information. The configuration change execution unit stops the virtual servers on the selected physical server. Further, the configuration change target selection unit selects a physical server allocated with the most number of operating virtual servers. Further, the configuration change execution unit starts the virtual servers on the selected physical server.

The server management device having such a configuration produces an effect in which the virtual servers on the physical server allocated with a small number of operating virtual servers are moved (biased) onto another physical server and the physical server allocated with no operating virtual machine is stopped to easily reduce power consumption. This effect is more markedly obtainable by intentionally creating a physical server allocated with a small number of operating virtual servers.

PTL 3 discloses a server migration plan creation system. On the basis of the respective amounts of resource use of source servers and the respective resource capacities of destination servers, the server migration plan creation system described in PTL 3 creates a server migration plan for allocating the destination of the source server to any one of the destination servers. The server migration plan creation system selects the source servers one by one in descending order of the amounts of resource use. Then, the server migration plan creation system selects any one of the destination servers and compares a target use amount that is the amount of resource use of the previously selected source server and a remaining amount of the resource capacity of the selected destination server. Then, when the target use amount is larger than the remaining amount of the resource capacity, the server migration plan creation system selects a destination server other than the already selected destination server and performs the comparison again. Further, when the target use amount is at most the remaining amount of the resource capacity, the server migration plan creation system allocates the selected destination server as the destination of the selected source server.

CITATION LIST

Patent Literature

PTL 1: WO/2011/118424
PTL 2: Japanese Laid-open Patent Publication No. 2011-90594
PTL 3: Japanese Patent No. 4853717

SUMMARY OF INVENTION

Technical Problem

However, in the techniques described in the patent literature, there is noted a problem in which upon a disposition change (upon a configuration change, upon a server migration) of virtual servers in a virtual-machine-type thin client system, the experience performance of a user who is a client deteriorates in some cases.

The reason is that the techniques described in the patent literature are as follows. Firstly, the machine operation plan creation device described in PTL 1 creates an operation plan without considering a connection status between a client and a server upon a disposition change of the server. Further, the server management device of PTL 2 does not consider a connection status between a client and a server upon a configuration change of a virtual machine (a stop and a start of a virtual server on a physical server). Further, the server migration plan creation system of PTL 3 creates an operation plan without considering a connection status between a client and a server upon a server migration.

The virtual-machine-type thin client system is, for example, a system in which a client is network-connected to a desktop environment of a user that operates as a virtual machine on a server over a long time, and thereby, the client can operate the desktop from a remote location. When in such a system, a disposition change (a configuration change, a server migration) of a virtual machine is performed using the techniques described in the patent literature, a virtual machine being connected with the client is very likely to be moved from a certain physical server to another server. Such a movement deteriorates the experience performance of the user due to an overhead upon the movement.

An object of the present invention is to provide an information processing device, a method for generating a machine disposition plan and a program that solve the problem.

Advantageous Effects of Invention

Solution to Problem

An information processing device according to one aspect of the present invention includes:

connection time determination means for calculating, for each first virtual machine, a time slot coverage rate that is a fraction of a time covered by a high-load time slot of said first virtual machine among a connection time slot of said each first virtual machine obtained from a connection history between each of a plurality of said first virtual machines and a client, determining whether said calculated time slot coverage rate exceeds a minimum coverage rate determined as a lower limit of said time slot coverage rate, and determining said first virtual machine having said time slot coverage rate corresponding to said first virtual machine determined to exceed said minimum coverage rate as a second virtual machine; and disposition plan generating means for calculating a number of physical servers necessary to hold said second virtual machines in each of said high-load time slot and a low-load time slot that is a time slot other than said high-load time slot based on resource use amount data chronologically indicating amounts of resource use of said second virtual machines, and outputting said calculated number and said second virtual machines by associating said number to said virtual machines.

A machine disposition planning method according to one aspect of the present invention, which a computer:

calculates, for each first virtual machine, a time slot coverage rate that is a fraction of a time covered by a high-load time slot of said first virtual machine among a connection time slot of said each first virtual machine obtained from a connection history between each of a plurality of said first virtual machines and a client;

determines whether said calculated time slot coverage rate exceeds a minimum coverage rate determined as a lower limit of said time slot coverage rate;

determines said first virtual machine having said time slot coverage rate corresponding to said first virtual machine determined to exceed said minimum coverage rate as a second virtual machine;

calculates a number of physical servers necessary to hold said second virtual machines in each of said high-load time slot and said low-load time slot based on resource use amount data chronologically indicating amounts of resource use of said second virtual machines; and outputs said calculated number and said second virtual machines by associating said number to said virtual machines.

A non-volatile recording medium according to one aspect of the present invention recording a program for causing a computer to:

calculate, for each first virtual machine, a time slot coverage rate that is a fraction of a time covered by a high-load time slot of said first virtual machine among a connection time slot of said each first virtual machine obtained from a connection history between each of a plurality of said first virtual machines and a client;

determine whether said calculated time slot coverage rate exceeds a minimum coverage rate determined as a lower limit of said time slot coverage rate;

determine said first virtual machine having said time slot coverage rate corresponding to said first virtual machine determined to exceed said minimum coverage rate as a second virtual machine;

calculate a number of physical servers necessary to hold said second virtual machines in each of said high-load time slot and said low-load time slot based on resource use amount data chronologically indicating amounts of resource use of said second virtual machines; and output said calculated number and said second virtual machines by associating said number to said virtual machines.

The present invention has an advantage enabling to output a machine disposition plan for moving virtual machines while suppressing deterioration in the experience performance of a client user in a virtual-machine-type thin client system.

BRIEF DESCRIPTION OF DRAWINGS

FIG. 3 is a view illustrating one example of a connection history.

FIG. 6 is a view illustrating one example of a low-load time slot portion resource use amount history.

FIG. 10 is a flowchart illustrating an operation of the machine disposition planning device in the second exemplary embodiment.

DESCRIPTION OF EMBODIMENTS

Exemplary embodiments of the present invention will be described in detail with reference to the drawings. In each drawing and each exemplary embodiment described herein, substantially the same component is assigned with the same reference sign, and description thereof is appropriately omitted.

First Exemplary Embodiment

Figure 1:
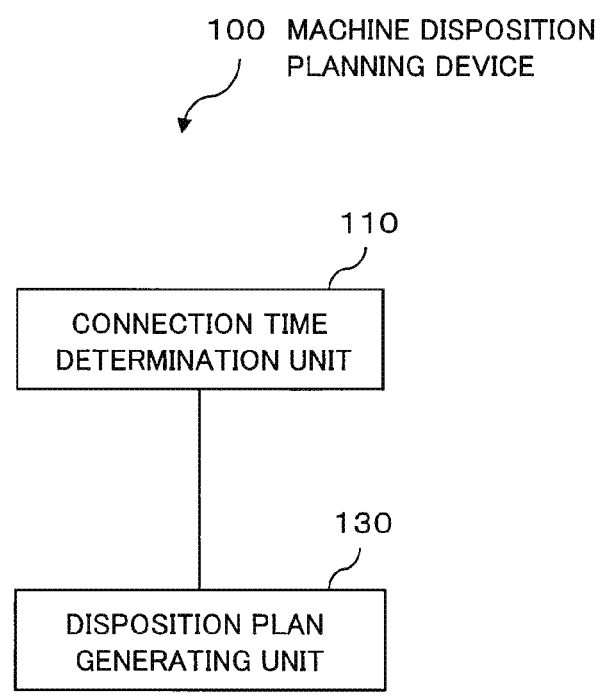
FIG. 1 is a block diagram illustrating a configuration of a machine disposition planning device according to a first exemplary embodiment.

FIG. 1 is a block diagram illustrating a configuration of a machine disposition planning device 100 according to a first exemplary embodiment of the present invention. The machine disposition planning device is also referred to as an information processing device.

As illustrated in FIG. 1, the machine disposition planning device 100 according to the present exemplary embodiment includes a connection time determination unit 110 and a disposition plan generating unit 130.

Figure 2:
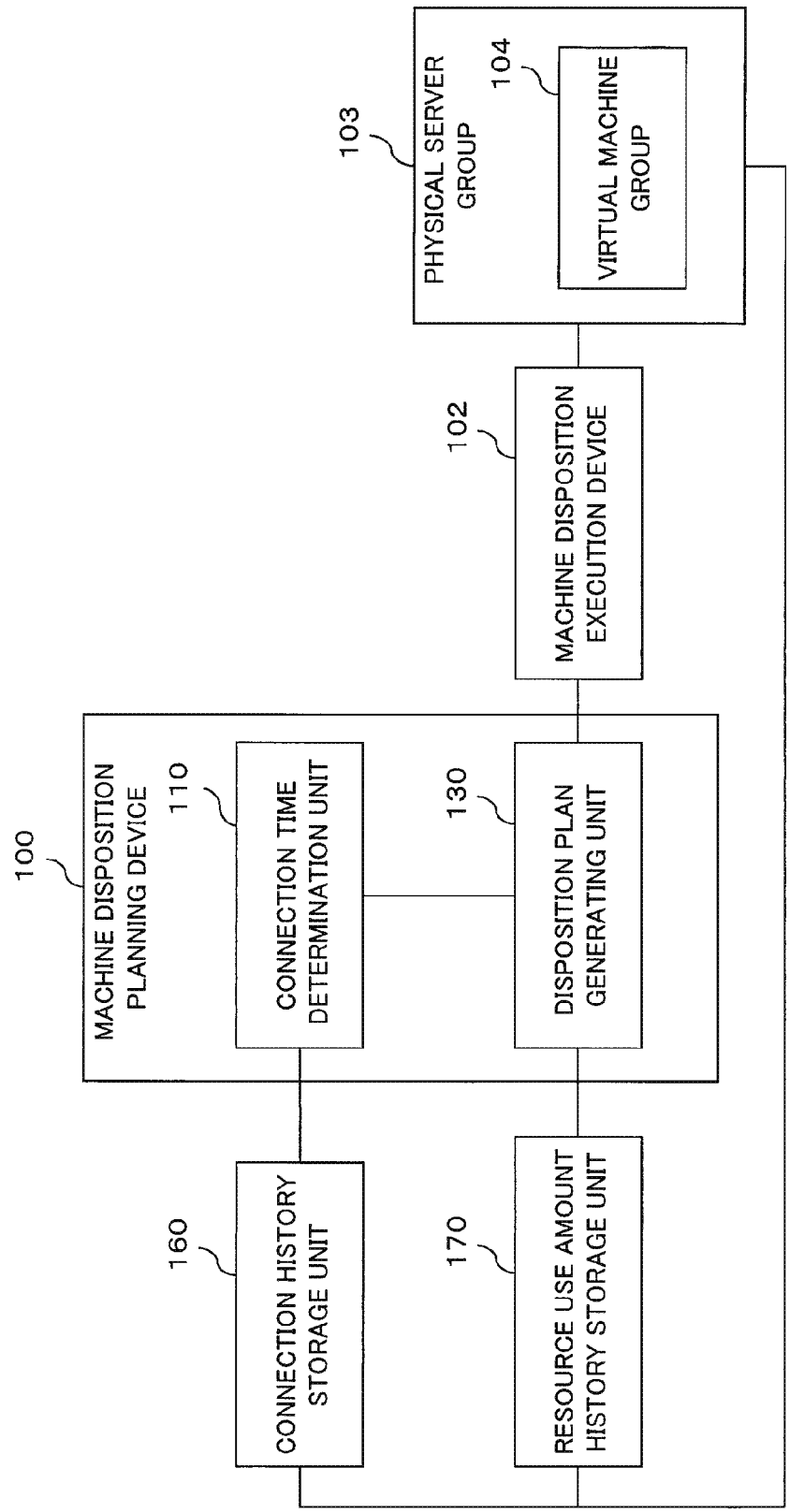
FIG. 2 is a block diagram illustrating a configuration of a machine disposition system including the machine disposition planning device according to the first exemplary embodiment.

FIG. 2 is a block diagram illustrating a configuration of a machine disposition system 101 including the machine disposition planning device 100 according to the first exemplary embodiment of the present invention.

As illustrated in FIG. 2, the machine disposition system 101 includes the machine disposition planning device 100, a machine disposition execution device 102, a physical server group 103, a virtual machine group 104, a connection history storage unit 160, and a resource use amount history storage unit 170. The machine disposition planning device 100, the machine disposition execution device 102, the connection history storage unit 160, and the resource use amount history storage unit 170 are connected to each other via an interface that is not illustrated. Further, the machine disposition execution device 102 and the disposition plan generating unit 130 are connected via an interface that is not illustrated. Further, the physical server group 103 and the connection history storage unit 160 as well as the resource use amount history storage unit 170 are connected to each other via an interface that is not illustrated.

The connection history storage unit 160 and the resource use amount history storage unit 170 may be included in the machine disposition planning device 100. When being included in the machine disposition planning device 100, each of the connection history storage unit 160 and the resource use amount history storage unit 170 may be included in each of the connection time determination unit 110 and the disposition plan generation unit 130. Further, the connection history storage unit 160 and the resource use amount history storage unit 170 may be included in the machine disposition execution device 102.

Further, the machine disposition planning device 100 may be included in the machine disposition execution device 102. Alternatively, the machine disposition planning device 102 may be included in the machine disposition planning device 100.

Initially, each component of the machine disposition system 101 will be described.

===Connection History Storage Unit 160===

The connection history storage unit 160 stores a connection history of each virtual machine (a first virtual machine) included in the virtual machine group 104 over a certain time (e.g., one week) of the past. FIG. 3 is a view illustrating one example of a connection history 161 stored by the connection history storage unit 160. As illustrated in FIG. 3, the connection history 161 includes at least one connection time record 1611 including a VMID (Virtual Machine Identifier), a connection start day and time, and a disconnection day and time.

The VMID is an identifier for identifying a virtual machine. The connection start day and time and the disconnection day and time are occurrence times of connection and disconnection, respectively, between each virtual machine and each client (not illustrated).

===Resource Use Amount History Storage Unit 170===

Figure 4:
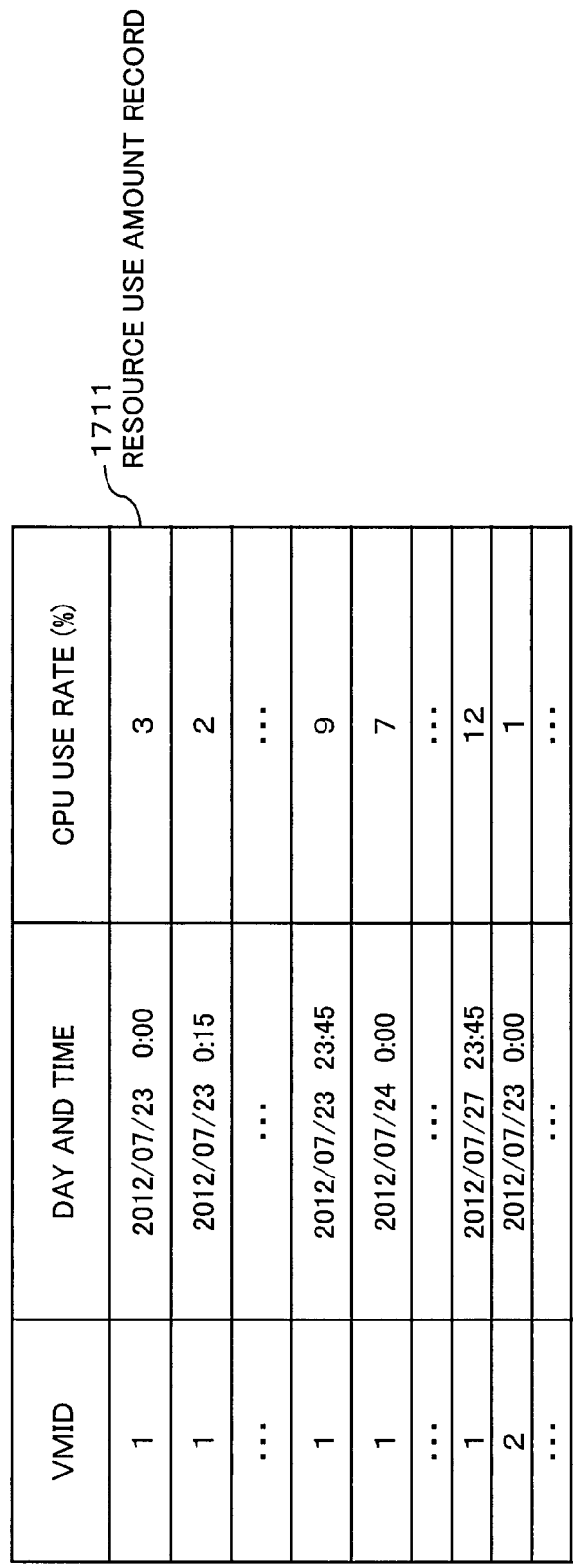
FIG. 4 is a view illustrating one example of a resource use amount history.

The resource use amount history storage unit 170 stores a resource use amount history of each virtual machine included in the virtual machine group 104 over a certain time (e.g., one week) of the past. FIG. 4 is a view illustrating one example of a resource use amount history 171 stored by the resource use amount history storage unit 170. As illustrated in FIG. 4, data of the amount of resource use included in the resource use amount history 171 includes at least one resource use amount record (referred to also as resource use amount data) 1711 including a VMID, a day and time, and a CPU (Central Processing Unit) use rate.

The resource use amount history 171 is time-series data with respect to the amount of resource use of a virtual machine. The resource use amount history 171 illustrated in FIG. 4 is an example of a resource use amount history, in which a CPU (Central Processing Unit) use rate is designated as the amount of resource use. Each resource use amount record 1711 of the resource use amount history 171 includes a sampling value of a CPU use rate in a day and time obtained at 15-minute intervals.

===Machine Disposition Planning Device 100===

The machine disposition planning device 100 generates a disposition plan by referring to the connection history storage unit 160 and the resource use amount history storage unit 170 and transmits the generated disposition plan to the machine disposition execution device 102. Details of the machine disposition planning device 100 will be described later.

===Machine Disposition Execution Device 102===

The machine disposition execution device 102 disposes respective virtual machines of the virtual machine group 104 on physical servers included in the physical server group 103 based on the received disposition plan.

===Physical Server Group 103 and Virtual Machine Group 104===

The physical server group 103 includes at least one physical server. The virtual machine group 104 includes at least one virtual machine. Each of the virtual machines is operated by a resource of any one of these physical servers.

Each physical server records each of connection time information and resource use amount history information of a virtual machine disposed for itself onto each of the connection history storage unit 160 and the resource use amount history storage unit 170. The each physical server may transmit the connection time information and the resource use amount history information of the virtual machine disposed for itself to the machine disposition planning device 100 or the machine disposition execution device 102. In this case, the machine disposition planning device 100 and the machine disposition execution device 102 may record each of the received connection time information and the received resource use amount history information onto each of the connection history storage unit 160 and the resource use amount history storage unit 170.

Next, each component included in the machine disposition planning device 100 in the first exemplary embodiment will be described in detail. The components illustrated in FIG. 1 may be components as hardware units or components divided into functional units of a computer device. The components illustrated in FIG. 1 will be described as components divided into functional units of a computer device.

===Connection Time Determination Unit 110===

The connection time determination unit 110 acquires a connection time record 1611 of a connection time of each virtual machine from a connection history 161 stored by the connection history storage unit 160.

Then, the connection time determination unit 110 calculates a time slot coverage rate for the each virtual machine. The time slot coverage rate is a fraction where a connection time slot obtained from the acquired connection time record 1611 of the connection time of the each virtual machine is covered by a high-load time slot. The high-load time slot refers to a time slot determined as a high-load time slot of the virtual machine.

It is assumed that, for example, a virtual machine providing a thin client service is operated for 24 hours and that operating time can be categorized into two time slots that are a continuous time slot having a relatively high-load (a high-load time slot) and a time slot having a low-load (a low-load time slot) other than the former. Then, it is assumed that the high-load time slot ranges from 9:00 to 17:00 and the low-load time slot ranges from 0:00 to 9:00 and 17:00 to 24:00 (i.e., 17:00 to 9:00 of the next day). At that time, the high-load time slot means information that is 'from 9:00 to 17:00.'

The high-load time slot may be previously held inside the connection time determination unit 110 or set in the connection time determination unit 110 using input means that is not illustrated. Further, the high-load time slot may be acquired from the outside using high-load time slot acquisition means (not illustrated) included in the machine disposition planning device 100.

Then, the connection time determination unit 110 determines, for each virtual machine, whether the calculated time slot coverage rate corresponding to the each virtual machine exceeds a minimum coverage rate. The connection time determination unit 110 determines a virtual machine of which the calculated time slot coverage rate exceeds the minimum coverage rate as a determination passage virtual machine (referred to also as a second virtual machine).

The minimum coverage rate is a value determined as a lower limit of the time slot coverage rate. The minimum coverage rate is typically a value close to 100% such as 0.95 (95%), 0.99 (99%), and 0.999 (99.9%). Further, the minimum coverage rate may be 1 (100%).

The minimum coverage rate may be previously held inside the connection time determination unit 110 or set in the connection time determination unit 110 using input means that is not illustrated. Further, the minimum coverage rate may be acquired from the outside using minimum coverage rate acquisition means (not illustrated) included in the machine disposition planning device 100.

===Disposition Plan Generating Unit 130===

The disposition plan generating unit 130 extracts a resource use amount record 1711 of a high-load time slot corresponding to each determination passage virtual machine from a resource use amount history 171 stored by the resource use amount history storage unit 170.

Then, the disposition plan generating unit 130 calculates the number of physical servers necessary to hold respective determination passage virtual machines in the high-load time slot, based on the extracted resource use amount record 1711 of the high-load time slot. In the same manner, the disposition plan generating unit 130 calculates the number of physical servers necessary to hold the determination passage virtual machines in a low-load time slot, based on a resource use amount record 1711 of the low-load time slot. The disposition plan generating unit 130 outputs a set of the calculated number and VMIDs of the determination passage virtual machines.

The above is description of each component as a functional unit of the machine disposition planning device 100.

Next, a component of a hardware unit of the machine disposition planning device 100 will be described.

FIG. 16 is a diagram illustrating a hardware configuration of a computer 700 for implementing the machine disposition planning device 100 according to this exemplary embodiment.

As illustrated in FIG. 16, the computer 700 includes a CPU (Central Processing Unit) 701, a storage unit 702, a storage device 703, an input unit 704, an output unit 705, and a communication unit 706. In addition, the computer 700 includes a recording medium (or a storage medium) 707 provided externally. The recording medium 707 may be a nonvolatile recording medium storing information non-temporarily.

The CPU 701 controls the entire operation of the computer 700 by causing the operating system (not illustrated) to operate. In addition, the CPU 701 loads a program or data from the recording medium 707 supplied to the storage device 703, for example, and writes the loaded program or data in the storage unit 702. Here, the program is, for example, a program for causing the computer 700 to perform the operations in the flowcharts presented in FIG. 8 to be described later.

Then, the CPU 701 carries out various processes as the connection time determination unit 110 and the disposition plan generation unit 130 presented in FIG. 1, according to the loaded program or on the basis of the loaded data.

Alternatively, the CPU 701 may be configured to download a program or data from an external computer (not illustrated) connected to a communication network (not illustrated), to the storage unit 702.

The storage unit 702 stores programs and data. The storage unit 702 may include the connection history storage unit 160 and the resource use amount history storage unit 170.

For example, the storage device 703 is an optical disc, a flexible disc, a magnetic optical disc, an external hard disk, or a semiconductor memory, and includes a non-volatile storage medium 707. The storage device 703 records a program so that it is computer-readable. The storage device 703 may record data. The storage device 703 may store the data set 510, extracted record group 530, common portion record group 540, anonymous group conclusion record group 562, assumption anonymous group data set 611 and conclusion anonymous group data set 612. The storage device 703 may include the connection history storage unit 160 and the resource use amount history storage unit 170.

The input unit 704 is realized by a mouse, a keyboard, or a built-in key button, for example, and used for an input operation. The input unit 704 is not limited to a mouse, a keyboard, or a built-in key button, it may be a touch panel, an accelerometer, a gyro sensor, or a camera, for example.

The output unit 705 is realized by a display, for example, and is used in order to check the disclosure response 650, for example.

The communication unit 706 realizes communication with the machine disposition planning device 102, the connection history storage unit 160 and the resource use amount history storage unit 170. The communication unit 706 may be included in the connection time determination unit 110 and the disposition plan generation unit 130 as a part of each of them.

Figure 7:
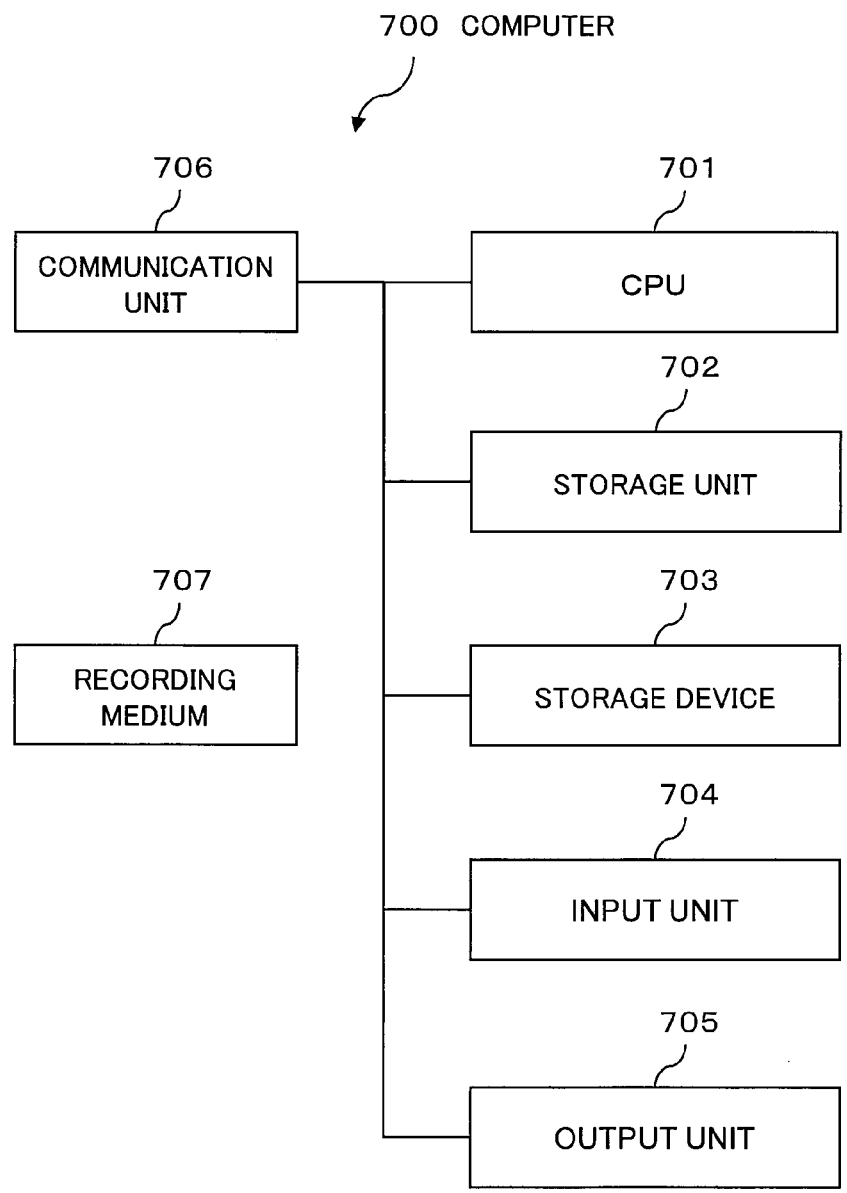
FIG. 7 is a diagram illustrating a hardware configuration of a computer realizing a machine disposition planning device.

As described above, the blocks serving as functional units of the machine disposition planning device 100 illustrated in FIG. 1 may be implemented by the computer 700 having the hardware configuration illustrated in FIG. 7. However, means for implementing the units included in the computer 700 are not limited to those described above. In other words, the computer 700 may be implemented by a single physically-integrated device, or may be implemented by two or more physically-separated devices that are connected to each other with wire or by wireless.

Instead, the recording medium 707 with the codes of the above-described programs recorded therein may be provided to the computer 700, and the CPU 701 may be configured to load and then execute the codes of the programs stored in the recording medium 707. Alternatively, the CPU 701 may be configured to store the codes of each program stored in the recording medium 707, in the storage unit 702, the storage device 703, or both. In other words, this exemplary embodiment includes an exemplary embodiment of the recording medium 707 for storing programs (software) to be executed by the computer 700 (CPU 701) in a transitory or non-transitory manner.

The above is the description of hardware about each component of the computer 700 which realizes the machine disposition planning device 100.

Next, an operation of the present exemplary embodiment will be described in detail with referent to FIG. 1 to FIG. 8.

Figure 8:
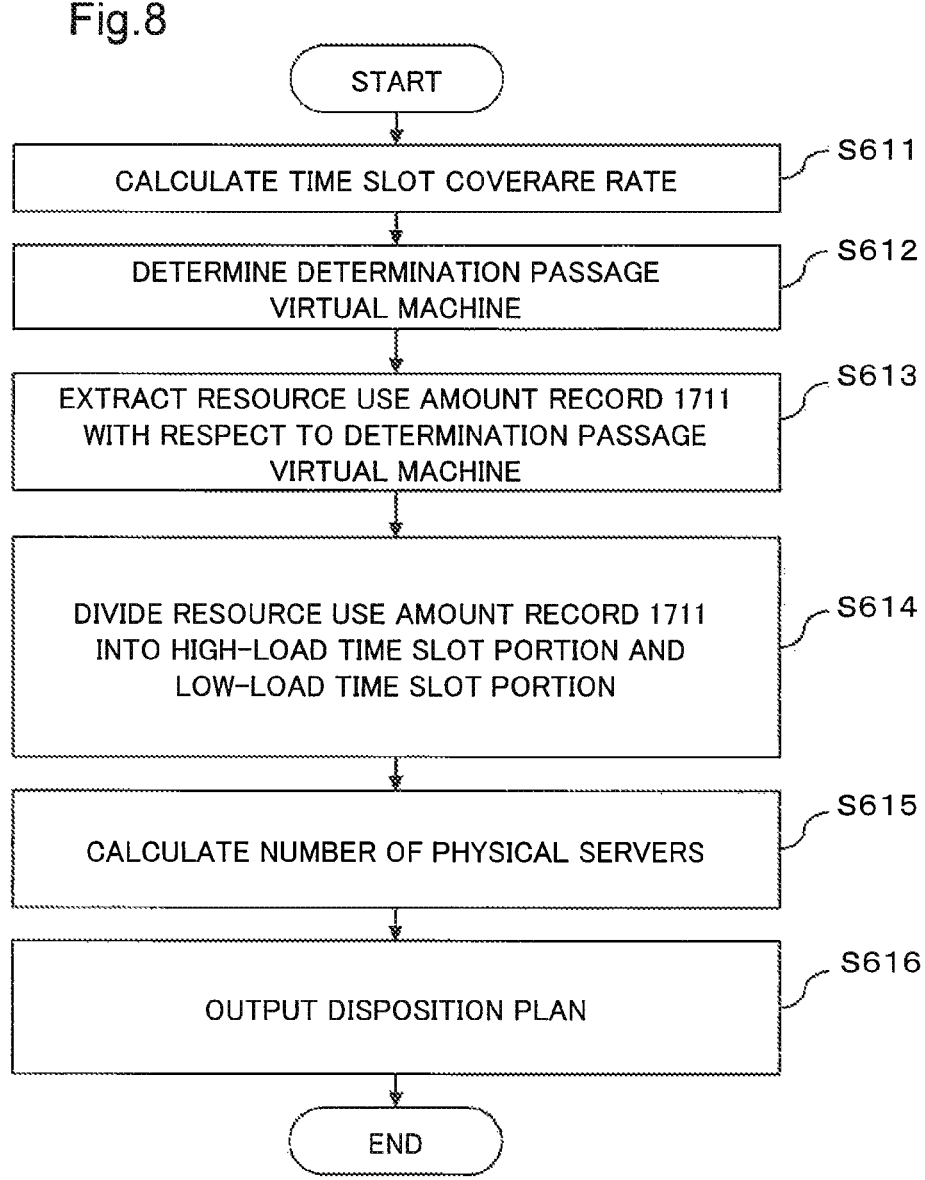
FIG. 8 is a flowchart illustrating an operation of the machine disposition planning device in the first exemplary embodiment.

FIG. 8 is a flowchart illustrating the operation of the present exemplary embodiment. Processing according to this flowchart may be executed based on a program control using a CPU as described above. Further, a step name of the processing is represented by a symbol such as step S601.

The connection time determination unit 110 calculates a time slot coverage rate for each virtual machine (step S611).

Then, the connection time determination unit 110 determines, for the each virtual machine, a virtual machine of which the calculated time slot coverage rate exceeds a minimum coverage rate as a determination passage virtual machine (step S612).

It is assumed that, for example, connection time slots extracted from connection history records 1611 corresponding to a given virtual machine A are '9:05 to 16:45 of 2012/07/24,' '10:00 of 2012/07/25 to 12:00 of the same day,' '15:00 of 2012/07/25 to 17:30 of the same day,' and '8:45 of 2012/07/27 to 18:00 of the same day.' At that time, times (minutes) of connection time slots corresponding to the respective connection histories are 460 minutes, 120 minutes, 150 minutes, and 555 minutes. Thereby, the connection time determination unit 110 calculates a total time of the connection time slots as 1285 minutes.

Assuming that a high-load time slot is '9:00 to 17:00,' times (minutes) of time slots that are not included in the high-load time slot corresponding to the respective connection time slots are 0 minute, 0 minute, 30 minutes, and 75 minutes. Thereby, the connection time determination unit 110 calculates a total time of the connection time slots that are not included in the high-load time slot as 105 minutes. Further, the connection time determination unit 110 calculates a time of connection time slots included in the high-load time slot as 1285 minutes−105 minutes=1180 minutes. Thereby, the connection time determination unit 110 calculates a time slot coverage rate for the virtual machine A as 1180/1285≅0.918 (91.8%).

Subsequently, when, for example, the minimum coverage rate is 90%, the connection time determination unit 110 determines the virtual machine A as 'a determination passage virtual machine of which the time slot coverage rate exceeds the minimum coverage rate.' Further, when the minimum coverage rate is 95%, the connection time determination unit 110 does not determine the virtual machine A as a determination passage virtual machine.

The connection time determination unit refers to the connection history 161 of each virtual machine as illustrated in FIG. 3, executes determination processing as described above, and determines a determination passage virtual machine. The determination passage virtual machines (a determination passage virtual machine group) determined as described above are virtual machines that most of connection time slots in which a client (user) establishes connections are included in a high-load time slot for, and on the contrary, client are substantially not connected in a low-load time slot.

Then, the disposition plan generating unit 130 extracts a resource use amount record 1711 with respect to each determination passage virtual machine from the resource use amount history 171 stored by the resource use amount history storage unit 170 (step S613).

Then, the disposition plan generating unit 130 divides the extracted resource use amount record 1711 into a resource use amount record 1711 of a high-load time slot portion and a resource use amount record 1711 of a low-load time slot portion other than the former (step S614).

Figure 5:
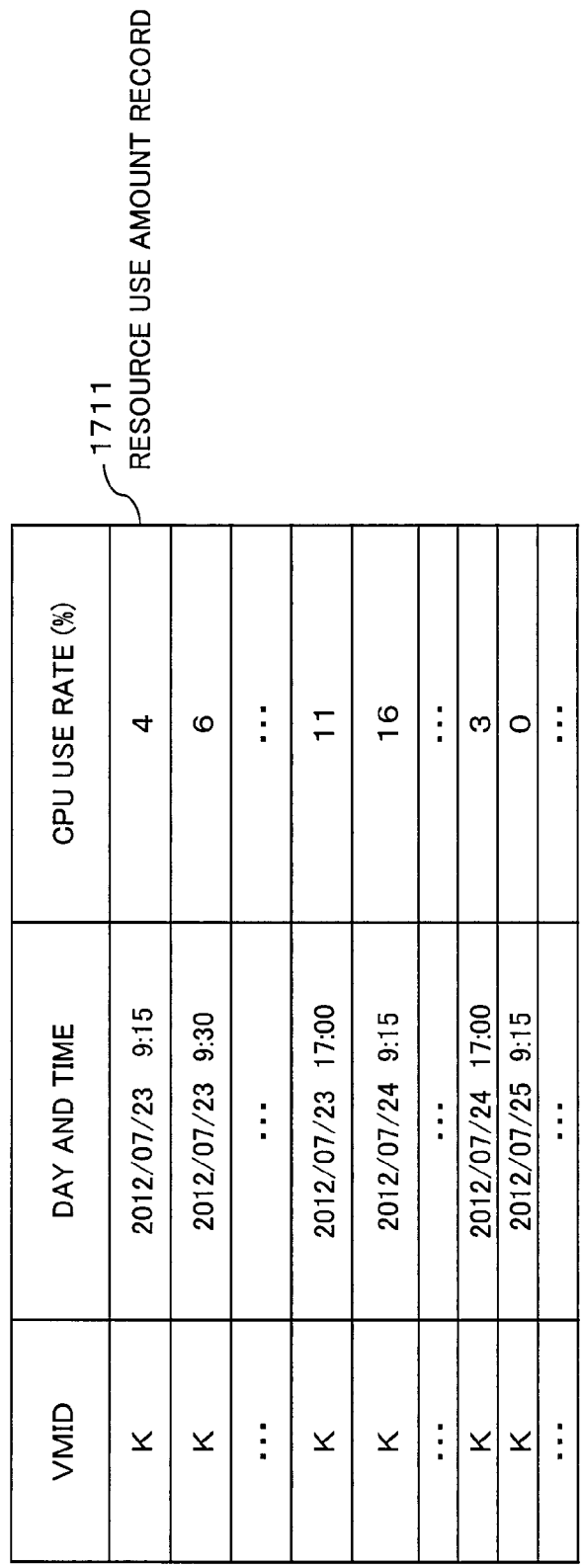
FIG. 5 is a view illustrating one example of a high-load time slot portion resource use amount history.

The divided resource use amount records 1711 each are illustrated in FIG. 5 and FIG. 6 as one example. FIG. 5 illustrates one example of a high-load time slot resource use amount history 172 in which the CPU use rate history with respect to a determination passage virtual machine K is divided for a high-load time slot '9:00 to 17:00' as described above. FIG. 6 illustrates one example of a low-load time slot resource use amount history 173 in the same manner.

The CPU use rates illustrated in FIG. 5 and FIG. 6 are sampling values at 15-minute intervals. It is assumed that, for example, a CPU use rate of a resource use amount record 1711 of a day and time of '9:15' indicates a CPU use rate from 9:00 to 9:15. Therefore, each resource use amount record 1711 from 9:15 to 17:00 corresponds to a CPU use rate from 9:00 to 17:00. The disposition plan generating unit 130 divides, as described above, a resource use amount record 1711 corresponding to every determination passage virtual machine.

Then, the disposition plan generating unit 130 calculates the number of physical servers necessary to hold a virtual machine group 104 in a high-load time slot based on the resource use amount record 1711 of the high-load time slot of the determination passage virtual machine group (step S615). At the same time, the disposition plan generating unit 130 calculates the number of physical servers necessary to hold a virtual machine group 104 in a low-load time slot based on the resource use amount record 1711 of the low-load time slot of the determination passage virtual machine group (step S615).

For example, how many physical servers are needed to hold a plurality of virtual machines when the amounts of resource use thereof are provided is formulated as a packing problem.

As described in Background Art, PTL 3 discloses the following technique. The technique is a technique for calculating the number of physical servers necessary to hold (pack) virtual severs and information on disposition of the virtual servers in the physical servers, from the amounts of resource use of source servers (the virtual machines) and resource amounts of destination servers (the physical servers).

The disposition plan generating unit 130 calculates, for each virtual machine, an average value of the amounts of resource use from the resource use amount records 1711 of the amounts of resource use of a high-load time slot. The disposition plan generating unit 130 designates this average value as the amount of resource use of the virtual machine and uses a predetermined resource amount of the physical server to calculate the number of physical servers necessary to hold a determination passage virtual machine group in the high-load time slot, using the technique of PTL 3. Further, at the same time, the disposition plan generating unit 130 generates information on disposition of the virtual machines in the physical servers.

At that time, when the amount of resource use is designated as the CPU use rate, a threshold of the CPU use rate during server operation is set as the resource amount of the physical server. The threshold of the CPU use rate is typically set to be around 80%, but when high performance is necessary, the threshold is set to be about 50% in some cases.

Then, the disposition plan generating unit 130 outputs, as a disposition plan, a set of these calculated numbers of physical servers necessary for the high-load time slot and the low-load time slot and VMIDs of the corresponding determination passage virtual machines (i.e., disposition information of the determination passage virtual machines) (step S616).

The above is description of the operation of the present exemplary embodiment.

In the exemplary embodiment, it was assumed that only one high-load time slot was present in 24 hours and also continuous, but a plurality of high-load time slots may be present. For example, two high-load time slots that are '7:00 to 9:00' and '17:00 to 19:00' corresponding to commuting times of employees may be present. Also in this case, in the same manner, the number of necessary physical servers and a disposition plan of virtual machines from 7:00 to 9:00, from 9:00 to 17:00, from 17:00 to 19:00, and from 19:00 to 7:00 of the next day are calculable.

Using the disposition plan output by the machine disposition planning device 100, the machine disposition execution device 102 executes machine disposition and thereby, the following system operation is made possible.

It is assumed that, for example, the disposition plan indicates that the number of servers necessary for a high-load time slot (9:00 to 17:00) is five and the number of servers necessary for a low-load time slot (17:00 to 9:00 of the next day) is three. In this case, the machine disposition execution device 102 migrates (biases) virtual machines on two physical servers to the remaining three physical servers for 16 hours from 17:00 to 9:00 and then the two physical servers are stopped, whereby power consumption thereof can be saved.

Further, during migration processing for virtual machines, an overhead and the like associated with the migration processing causes virtual machine performance to deteriorate. However, when the machine disposition execution device 102 executes migration processing based on the disposition plan, a probability of a connection from a user to any one of the virtual machines during migration relatively decreases. Therefore, it is possible to suppress deterioration in user experience performance.

For example, in a thin client system commonly used in a company, a connection time of the user is likely to be linked to business hours of the company. Therefore, time slots in which the user establishes connections on a business day exhibit periodicity with high probability. In this case, the connect history 161 holds data (a connection time record 1611) only for the business day and a disposition plan obtained by the machine disposition planning device 100 is set as a plan for the business day. Thereby, a useful disposition plan is obtainable. Further, in general, the amount (load) of resource use of a virtual machine is large during connection and small during no connection. Therefore, outside business hours in which a small number of connections are established, just a small number of servers are needed in many cases.

As described above, when the machine disposition execution device 102 executes machine disposition using a disposition plan provided by the present exemplary embodiment, an operation control of a physical server useful, for example, upon biasing of a virtual machine in a thin client system can be performed. Further, when the operation plan is used, the machine disposition execution device 102 can bias, as a target, a virtual machine having a small number of connections from the user in a low-load time slot in which biasing is performed. Therefore, deterioration in user experience quality due to reduction of power consumption of the physical server can be suppressed.

The effect in the present exemplary embodiment is that a machine disposition plan for moving a virtual machine while suppressing deterioration in the experience performance of a client user can be output.

The reason is that the following configuration is included. That is to say, firstly, the connection time determination unit 110 determines a virtual machine having a time slot coverage rate in which a connection time slot of the virtual machine is covered by a high-load time slot exceeds a minimum coverage rate. Secondly, the disposition plan generating unit 130 generates and outputs a disposition plan of the determined virtual machine based on resource use amount data in a high-load time slot and a low-load time slot of the determined virtual machine.

Second Exemplary Embodiment

Next, a second exemplary embodiment of the present invention will be described in detail with reference to the drawings. Hereinafter, description of matters overlapping with the above description will be omitted unless description of the present exemplary embodiment is unclear.

Figure 9:
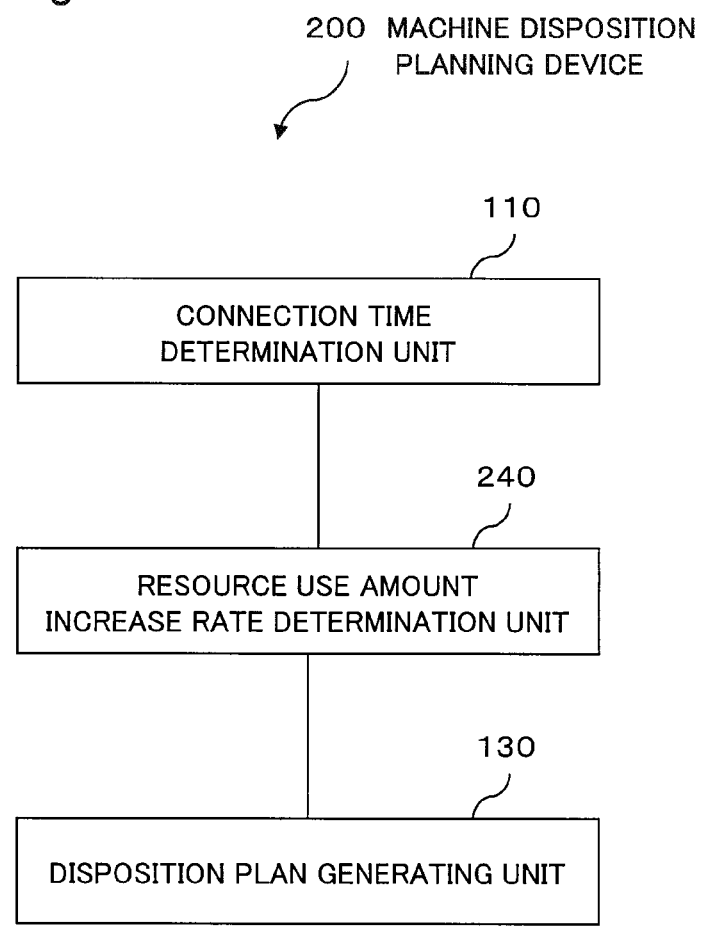
FIG. 9 is a block diagram illustrating a configuration of a machine disposition planning device according to a second exemplary embodiment.

FIG. 9 is a block diagram illustrating a configuration of a machine disposition planning device 200 according to the second exemplary embodiment of the present invention.

Referring to FIG. 9, the machine disposition planning device 200 in the present exemplary embodiment further includes a resource use amount increase rate determination unit 240, compared with the machine disposition planning device 100 of the first exemplary embodiment.

===Resource Use Amount Increase Rate Determination Unit 240===

The resource use amount increase rate determination unit 240 calculates a resource use amount increase rate based on a high-load time slot resource use amount history 172 and a low-load time slot resource use amount history 173.

The resource use amount increase rate means an increase rate of the amount of resource use of a virtual machine in a high-load time slot to the amount of resource use of the virtual machine in a low-load time slot.

Then, the resource use amount increase rate determination unit 240 further determines whether the calculated resource use amount increase rate exceeds a minimum resource use amount increase rate, with respect to each determination passage virtual machine determined by the connection time determination unit 110.

The minimum resource use amount increase rate refers to a value determined as a lower limit of the resource use amount increase rate. The minimum resource use amount increase rate is typically about 1.5 or a value larger than this value.

The minimum resource use amount increase rate may be previously held inside the resource use amount increase rate determination unit 240 or set in the resource use amount increase rate determination unit 240 using input means that is not illustrated. Further, the minimum resource use amount increase rate may be acquired from the outside using minimum resource use amount increase rate acquisition unit (not illustrated) included in the machine disposition planning device 100.

Then, the resource use amount increase rate determination unit 240 determines a certain determination passage virtual machine among the determination passage virtual machines determined by the connection time determination unit 110 as a new determination passage virtual machine (referred to also as a third virtual machine). The certain determination passage virtual machine is a determination passage virtual machine of which the calculated resource use amount increase rate is determined to exceed the lower limit of the resource use amount increase rate. In other words, the resource use amount increase rate determination unit 240 further narrows the determination passage virtual machines determined by the connection time determination unit 110.

===Disposition Plan Generating Unit 130===

The disposition plan generating unit 130 of the present exemplary embodiment executes the same processing as in the first exemplary embodiment for the new determination passage virtual machine determined by the resource use amount increase rate determination unit 240.

Next, an operation of the present exemplary embodiment will be described in detail with reference to the drawings.

FIG. 10 is a flowchart illustrating an operation of the machine disposition planning device 200 according to the present exemplary embodiment.

Operations of steps S611 to S614 in FIG. 10 are the same as operations of steps S611 to S614 in the first exemplary embodiment.

Subsequently to step S614, the resource use amount increase rate determination unit 240 calculates a resource use amount increase rate based on the high-load time slot resource use amount history 172 and the low-load time slot resource use amount history 173 (step S621).

Then, the resource use amount increase rate determination unit 240 determines whether the calculated resource use amount increase rate exceeds the lower limit of the resource use amount increase rate, with respect to each determination passage virtual machines determined by the connection time determination unit 110 (step S622). Then, the resource use amount increase rate determination unit 240 determines the determination passage virtual machine of which the calculated resource use amount increase rate is determined to exceed the lower limit of the resource use amount increase rate as a new determination passage virtual machine (step S622).

For example, an average resource use amount in a high-load time slot (9:00 to 17:00) of a certain virtual machine is determined by averaging CPU use rates included in a resource use amount history from 9:15 to 17:00. The same determination is performed for a low-load time slot. Assuming that the average CPU use rate of the high-load time slot of the virtual machine is 14(%) and the average CPU use rate of the low-load time slot thereof is 8(%), a resource use amount increase rate of the virtual machine is calculated as 14/8=1.75.

At that time, the resource use amount increase rate determination unit 240 determines the virtual machine as a determination passage virtual machine when a minimum resource use amount increase rate thereof is 1.5, but does not determine the virtual machine as a determination passage virtual machine when the minimum resource use amount increase rate is 2.0.

Operations of steps S615 to S616 in FIG. 10 are the same as operations of steps S615 to S616 in the first exemplary embodiment.

The above is description of the operation of the present exemplary embodiment.

When the machine disposition execution device 102 executes machine disposition using the disposition plan output by the machine disposition planning device 200, the following system operation is made possible.

The disposition plan output by the machine disposition planning device 200 is a disposition plan to allow an increase rate of the amount of resource use of a virtual machine in a high-load time slot to have at least a certain value. The machine disposition planning device 200 further performs a determination using the resource use amount increase rate determination unit 240, in addition to a determination using the connection time determination unit 110, to output the disposition plan. In other words, the disposition plan is a disposition plan to allow a decrease rate of the amount of resource use of a virtual machine in a low-load time slot to have at least a certain value.

Assuming that, for example, the minimum resource amount use increase rate is set to be 2.0, the amount of resource use in a low-load time slot is ½=0.5, i.e., about half an amount in a high-load time slot. Therefore, using the disposition plan, the machine disposition execution device 102 can bias virtual machines in the low-load time slot. Such an operation makes it possible that the machine disposition execution device 102 performs an operation for reducing the number of physical servers that hold the virtual machines by about half.

Further, the disposition plan output by the machine disposition planning device 200 makes it possible to recognize a virtual machine in which substantially no decrease in load occurs in a low-load time slot. An operation in which such a virtual machine is not designated as a biasing (moving) target is reasonable. Using the disposition plan, the machine disposition planning device 102 can perform an operation for holding the virtual machine in which substantially no change in load occurs in a specific physical server. In this case, daily load variations of the physical server are small and therefore, biasing is basically unnecessary.

In other words, there is avoidable a problem, in which a virtual machine having no increase in the amount of resource use in a high-load time slot and a virtual machine having an increase thereof are mixed and the virtual machine having no increase in the amount of resource use is also needed to be biased, resulting in occurrence of an unnecessary overhead associated with biasing.

In other words, using the disposition plan, the machine disposition execution device 102 can select only a virtual machine having at least a certain increase rate of the amount of resource use in the high-load time slot and designate the virtual machine as a biasing target. In this manner, the machine disposition execution device 102 can suppress the number of virtual machines to be biased and an overhead associated with biasing.

The effect in the present exemplary embodiment is that it is possible to output a disposition plan for reducing virtual machines as moving targets and further suppressing deterioration in the experience performance of a client user, in addition to the effect of the first exemplary embodiment.

The reason is that the resource use amount increase rate determination unit 240 further narrowed determination passage virtual machines based on resource use amount increase rates.

The respective components described in each exemplary embodiment do not necessarily exist independently of each other. For the respective components, for example, a plurality of components may be realized as a single module. Further, for the respective components, a single component may be realized as a plurality of modules. Further, for the respective components, a certain component may be configured as a part of another component. Further, for the respective components, a configuration may be made so that a part of a certain component and a part of another component overlap with each other.

The respective components of each exemplary embodiment described above and the module for realizing the respective components may be realized on a hardware basis, if possible, as necessary. Further, the respective components and the module for realizing the respective components may be realized using a computer and a program. Further, the respective components and the module for realizing the respective components may be realized by a mixture of a module on a hardware basis, a computer, and a program.

The program is provided by being recorded on a non-volatile, computer-readable recording medium such as a magnetic disk, a semiconductor memory, and the like and read by a computer upon starting the computer. The read program controls an operation of the computer to cause the computer to function as the components in each exemplary embodiment.

Moreover, while a plurality of operations are described in turn in a form of the flowchart according to each of the exemplary embodiments mentioned above, the turn of the description does not limit a turn of carrying out a plurality of operations Therefore, it is possible to change the turn of the plural operation as far as the change does not cause a substantial trouble.

Furthermore, according to each of the exemplary embodiments mentioned above, a plurality of operations are not limited to being carried out at times different each other. For example, while one operation is being carried out, another operation may be activated, and an execution timing of one operation and an execution timing of another operation may overlap each other partially or entirely.

Furthermore, while it is described in each of the exemplary embodiments mentioned above that one operation activates another operation, the description does not limit each relationship between one operation and the other operation. Therefore, when carrying out each exemplary embodiment, each relationship between the operations can be changed as far as the change does not cause a substantial problem. The specific description on each operation of each component does not limit each operation of each component. Therefore, each specific operation of each component may be changed as far as the change does not cause a problem to characteristics of function, performance or the like.

As mentioned above, although the present invention has been described with reference to the exemplary embodiments, the present invention is not limited to the above-mentioned exemplary embodiments. Various changes which a person skilled in the art can understand in the scope of the present invention can be performed in a configuration and details of the present invention.

This application claims priority based on Japanese Patent Application No. 2012-205670, filed on Sep. 19, 2012, the entire disclosure of which is incorporated herein.

INDUSTRIAL APPLICABILITY

The present invention is applicable to a device, a system, a method, and a program to realize a control for the number of operating devices and a control for reducing power consumption.

REFERENCE SIGNS LIST

100: Machine disposition planning device
101: Machine disposition system
102: Machine disposition execution device
103: Physical server group
104: Virtual machine group
110: Connection time determination unit
130: Disposition plan generating unit
160: Connection history storage unit
161: Connection history
170: Resource use amount history storage unit
171: Resource use amount history
172: High-load time slot resource use amount history
173: Low-load time slot resource use amount history
200: Machine disposition planning device
201: Resource use amount increase rate determination unit
700: Computer
701: CPU
702: Storage unit
703: Storage device
704: Input unit
705: Output unit
706: Communication unit
707: Recording medium
1611: Connection time record
1711: Resource use amount record

The invention claimed is:

1. An information processing device comprising:
a processor;
a connection time determination unit, executing on said processor, which calculates, for each first virtual machine, a time slot coverage rate that is a fraction of a time covered by a high-load time slot of said first virtual machine among a connection time slot of said each first virtual machine obtained from a connection history between each of a plurality of said first virtual machines and a client, determines whether said calculated time slot coverage rate exceeds a minimum coverage rate determined as a lower limit of said time slot coverage rate, and determines said first virtual machine having said time slot coverage rate corresponding to said first virtual machine determined to exceed said minimum coverage rate as a second virtual machine; and
a disposition plan generating unit which calculates a number of physical servers necessary to hold said second virtual machines in each of said high-load time slot and a low-load time slot that is a time slot other than said high-load time slot based on resource use amount data chronologically indicating amounts of resource use of said second virtual machines, and outputs said calculated number and said second virtual machines by associating said number to said virtual machines.

2. The information processing device according to claim 1 comprising a resource use amount increase rate determination unit which calculates a resource use amount increase rate based on data of said high-load time slot and data of said low-load time slot, determines, for said second virtual machine, whether said calculated resource use amount increase rate exceeds a minimum resource use amount increase rate determined as a lower limit of said resource use amount increase rate, and determines said second virtual machine having said resource use amount increase rate corresponding to said second virtual machine determined to exceed said minimum resource use amount increase rate as a third virtual machine.

3. The information processing device according to claim 2, wherein said resource use amount increase rate determination unit calculates an average amount of resource use in said high-load time slot and an average amount of resource use in said low-load time slot of each of said second virtual machines, and calculates said resource use amount increase rate by dividing the average amount of resource use in said high-load time slot by the average amount of resource use in said low-load time slot.

4. The information processing device according to claim 3, wherein said minimum resource use amount increase rate has a value of at least 1.5.

5. The information processing device according to claim 1, wherein said minimum coverage rate has a value of 1.0 or at least 0.9.

6. The information processing device according to claim 1, wherein a CPU use rate is used as said amount of resource use.

7. A machine disposition planning method, which a computer:

calculates, for each first virtual machine, a time slot coverage rate that is a fraction of a time covered by a high-load time slot of said first virtual machine among a connection time slot of said each first virtual machine obtained from a connection history between each of a plurality of said first virtual machines and a client;

determines whether said calculated time slot coverage rate exceeds a minimum coverage rate determined as a lower limit of said time slot coverage rate;

determines said first virtual machine having said time slot coverage rate corresponding to said first virtual machine determined to exceed said minimum coverage rate as a second virtual machine;

calculates a number of physical servers necessary to hold said second virtual machines in each of said high-load time slot and said low-load time slot based on resource use amount data chronologically indicating amounts of resource use of said second virtual machines; and outputs said calculated number and said second virtual machines by associating said number to said virtual machines.

8. The machine disposition planning method according to claim 7, which the computer further:

calculates a resource use amount increase rate based on data of said high-load time slot and data of said low-load time slot;

determines, for said second virtual machine, whether said calculated resource use amount increase rate exceeds a minimum resource use amount increase rate determined as a lower limit of said resource use amount increase rate; and determines said second virtual machine having said resource use amount increase rate corresponding to said second virtual machine determined to exceed said minimum resource use amount increase rate as a third virtual machine.

9. A non-transitory computer-readable recording medium recording a program for causing a computer to:

calculate, for each first virtual machine, a time slot coverage rate that is a fraction of a time covered by a high-load time slot of said first virtual machine among a connection time slot of said each first virtual machine obtained from a connection history between each of a plurality of said first virtual machines and a client;

determine whether said calculated time slot coverage rate exceeds a minimum coverage rate determined as a lower limit of said time slot coverage rate;

determine said first virtual machine having said time slot coverage rate corresponding to said first virtual machine determined to exceed said minimum coverage rate as a second virtual machine;

calculate a number of physical servers necessary to hold said second virtual machines in each of said high-load time slot and said low-load time slot based on resource use amount data chronologically indicating amounts of resource use of said second virtual machines; and output said calculated number and said second virtual machines by associating said number to said virtual machines.

10. The non-transitory computer-readable recording medium recording the program according to claim 9 for further causing a computer to:

calculate a resource use mount increase rate based on data of said high-load time slot and data of said low-load time slot;

determine, for said second virtual machine, whether said calculated resource use amount increase rate exceeds a minimum resource use amount increase rate determined as a lower limit of said resource use amount increase rate; and determine said second virtual machine having said resource use amount increase rate corresponding to said second virtual machine determined to exceed said minimum resource use amount increase rate as a third virtual machine.

* * * * *